United States Patent [19]
Burkus, II

[11] Patent Number: 5,916,993
[45] Date of Patent: Jun. 29, 1999

[54] SYNTHESIS OF A LINEAR PHOSPHONITRILIC CHLORIDE CATALYST

[75] Inventor: Frank Steven Burkus, II, Troy, N.Y.

[73] Assignee: General Electric Company, Schenectady, N.Y.

[21] Appl. No.: 09/002,137

[22] Filed: Dec. 31, 1997

[51] Int. Cl.$^6$ .................................................. C08G 77/04
[52] U.S. Cl. .................................. 528/33; 528/32; 528/43
[58] Field of Search ................................... 528/33, 32, 43

[56] References Cited

U.S. PATENT DOCUMENTS

| | | |
|---|---|---|
| 3,156,668 | 11/1964 | Pike et al. . |
| 3,839,388 | 10/1974 | Nitzsche et al. . |
| 5,210,129 | 5/1993 | de la Habimana et al. . |
| 5,403,909 | 4/1995 | Rubinsztajn ............................. 528/21 |
| 5,408,025 | 4/1995 | Thompson et al. ....................... 528/12 |
| 5,457,220 | 10/1995 | Razzano ................................... 528/21 |
| 5,585,451 | 12/1996 | Burkus, II et al. . |

OTHER PUBLICATIONS

"Elucidation of the Reaction of Phosphorous Pentachloride and Ammonium Chloride by Phosphorus–31 Nuclear Magnetic Resonance Spectroscopy", by J. Emsley et al., Inorganic Physics Theor., May 1970, pp. 3025–3029.

*Primary Examiner*—Melvyn I. Marquis
*Attorney, Agent, or Firm*—Noreen C. Johnson; Douglas E. Stoner

[57] ABSTRACT

The present invention relates to a process for the synthesis of a linear phosphonitrilic chloride LPNC catalyst solution in a siloxane medium. The process involves mixing phosphorus pentachloride with a suitable silazane followed by warming the reaction mixture to yield a LPNC catalyst solution.

11 Claims, No Drawings

SYNTHESIS OF A LINEAR PHOSPHONITRILIC CHLORIDE CATALYST

FIELD OF INVENTION

The present invention relates to a process of preparing a linear phosphonitrilic chloride catalyst (LPNC) solution.

BACKGROUND OF THE INVENTION

Linear phosphonitrilic chloride (LPNC) has been used as a catalyst to equilibrate organopolysiloxanes. Other LPNC-type materials, such as $Cl_2PONPCl_3$"PONP" , have also been found to be effective as catalysts. These materials, hereinafter collectively designated "phosphorus-nitrogen chloride" (PNC), have been made by procedures involving the use of $PCl_5$ and an ammonium salt, as disclosed in U.S. Pat. No. 3,839,388.

U.S. Pat. No. 3,835,388 discloses the use of vacuum in combination with a phosphonitrilic halide as an equilibration catalyst to facilitate the condensation and/or equilibration of silanol fluids. This process deals with the synthesis of the catalytic linear phosphonitrilic chloride (LPNC) species. This process utilizes toxic solvents, expensive separation techniques, and long reaction times. Such process drawbacks limit the production, and subsequent use of such catalysts in industry.

Preparation of LPNC catalysts has been disclosed by Emsley et al. in J. Chem. Soc. (A), 3025 (1970). This process uses phosphorus pentachloride and ammonium chloride as starting materials in solvents such as nitrobenzene. The reaction is carried out at elevated temperatures (>130° C.) and requires separation techniques for handling the air sensitive solids. Similarly, U.S. Pat. No. 5,210,129 uses phosphorus pentachloride and ammonium chloride as starting materials for the synthesis of LPNC catalysts. The reaction temperatures vary between 100° C. and 220° C., and the preferred reaction time is in excess of 6 hours.

The processes used for the synthesis of LPNC catalysts use undesirable toxic solvents, have longer reaction times, and need temperatures well in excess of 100° C. Such requirements make it difficult to make LPNC catalysts on larger scales and hamper their ease of use. There is thus a need for a process to make a LPNC catalyst that can be easily handled and used. It is desirable to have such procedures avoid the use of toxic solvents or cumbersome techniques. The process needs to be convenient such that the LPNC thus synthesized could be easily used as a catalyst without lengthy isolation procedures.

It has been surprisingly found that the process of the present invention can be carried out without using undesirable solvents such as nitrobenzene or tetrachloroethane. The process yields LPNC in a siloxane medium, which is preferred for storage and use because of compatibility with the utility of LPNC as an organosiloxane catalyst.

SUMMARY OF THE INVENTION

Keeping the different needs in mind the present invention provides a process for the synthesis of a linear phosphonitrilic chloride catalyst (LPNC) solution. The process comprises combining phosphorus pentachloride with a suitable silazane to form a reaction mixture, and warming the reaction mixture to an effective temperature to yield a LPNC catalyst.

DETAILED DESCRIPTION OF THE INVENTION

A preferred process of the invention involves the making of a linear phosphonitrilic chloride catalyst (LPNC) comprising: (a) combining phosphorus pentachloride with a suitable silazane in a molar ratio of from about 1:1 to about 4:1, in a siloxane medium at a temperature of from about −10° C. to about 75° C. for up to about 5 hours to form the reaction mixture; and (b) warming the reaction mixture to a temperature of from about 90° C. to about 150° C. for up to about 5 hours to yield a linear phosphonitrilic chloride catalyst solution.

A preferred embodiment of the instantly claimed process provides a process wherein the silazane is represented by:

Formula I

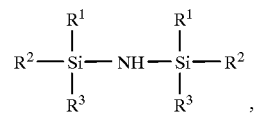

and the siloxane medium is represented by

Formula II

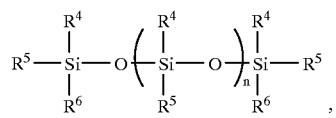

wherein $R^1$, $R^2$, $R^3$, $R^4$, $R^5$, and $R^6$ independently at each occurrence represent H, $C_{2-8}$ alkenyl; $C_{1-8}$ haloalkyl, $C_{1-8}$ alkenyl; $C_{3-8}$ cycloalkyl; $C_{3-8}$ cycloalkenyl; $C_{6-13}$ aryl; or $C_{6-13}$ haloaryl, and n represents an integer from 0 to 1000.

Another preferred embodiment of the present invention provides a process wherein $R^1$ independently at each occurrence represents $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, or H; $R^2$ independently at each occurrence represents $C_{2-6}$ alkenyl, or $C_{2-6}$ haloalkenyl; $R^3$ independently at each occurrence represents $C_{6-13}$ aryl, $C_{7-13}$ aralkyl, or $C_{7-13}$ halo aralkyl; $R^4$ and $R^6$ independently at each occurrence represent H, $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, $C_{2-6}$ alkenyl, $C_{2-6}$ haloalkenyl, $C_{6-13}$ aryl, $C_{7-13}$ aralkyl, or $C_{7-13}$ halo aralkyl; and $R^5$ represents $C_{1-14}$ alkyl.

A further preferred embodiment provides a process wherein the molar ratio of phosphorus pentachloride to the silazane is from about 2:1 to about 3:1, the preferred ratio being 2:1, and the temperature at which the two are combined is from about 0° C. to about 40° C., the preferred temperature being from about 5° C. to about 15° C.

A particularly preferred embodiment of the present invention provides a process wherein the haloalkyl is trifluoropropyl, the haloaryl is a chlorophenyl, the silazane is tetramethyidivinyl silazane or hexamethyldisilazane, and the siloxane medium is 20 cP(centipois) hexamethylsiloxane terminated polydimethylsiloxane (PDMS).

As used herein a suitable silazane refers to silazanes that will effectively react with $PCl_5$ to give the desired LPNC catalyst species, with the evolution of a non-interfering byproduct. Such silazanes react within the temperature range of the invention, are stable prior to use (when used under conditions known to one skilled in the art), and react to give the desired LPNC product. An illustrative example of a suitable silazane is represented by Formula I.

A siloxane medium, as used herein, is one which when mixed with the catalyst in a molar ratio of about 0.001 to about 0.99 (ratio of catalyst to the siloxane medium), produces a one phase catalytically active solution. The siloxane medium must not adversely affect LPNC or LPNC-like species thereby deactivating them. An illustrative example of a siloxane medium is represented by Formula II.

Also, as used herein, an effective temperature is a temperature at which at least some LPNC catalyst is formed. An alkyi group is intended to include a straight chain alkyl and branched alkyl.

It is known to one skilled in the art that the LPNC activity can be increased by adding an acid or a proton source to a LPNC solution before use, as disclosed in U.S. Pat. No. 5,585,451. This is applicable to the LPNC catalyst synthesized by the process of the instant invention, and is incorporated herein by reference.

EXAMPLES

General Procedure

The LPNC catalyst was prepared by combining $PCl_5$ and hexamethyldisilazane (HMDZ) in about a 2:1 to about a 3:1 molar ratio at a temperature of about 0° C. in a siloxane medium. The reaction mixture was stirred for about 1 hour at the lower temperature, after which the reaction mixture was gradually warmed up to a temperature of about 90–150° C. The reaction mixture was heated at the elevated temperature for about 1–3 hours resulting in a clear solution. The clearing of the solution was an indication of the formation of the LPNC catalyst. This resulting clear solution was then cooled to room temperature and the LPNC catalyst thus formed was then ready for use. The activity of this LPNC catalyst can be enhanced by the addition of a proton source, such as a strong protic acid, to the LPNC solution before use.

Example 1

In a three neck 500 ml round bottom flask, equipped with a reflux condenser, a nitrogen inlet and outlet, a magnetic stirring apparatus and a pressure equalizing addition funnel, was placed 267.7 g of 20 cP trimethylsiloxy terminated polydimethylsiloxane. The reaction flask was placed in an ice/salt water bath to let it cool to about 0° C. To the cooled reaction flask was added 5.8 g of $PCl_5$. The resulting mixture was stirred vigorously and 2.23 g HMDZ was added in a dropwise manner over a period of about 10–15 minutes using the pressure equalizing addition funnel. After the addition of HMDZ was over, the reaction mixture was warmed to room temperature, and the reaction mixture was heated for about 2–5 hours to about 120–130° C. using an oil bath. During the heating process the reaction mixture changed from a milky mixture/solution to a clear solution with some solid particles. After the heating process the reaction mixture was cooled to room temperature in a nitrogen atmosphere to yield the LPNC catalyst solution.

What is claimed is:

1. A process for the synthesis of linear phosphonitrilic chloride catalyst (LPNC) comprising:
   combining phosphorus pentachloride with a silazane at a temperature between −10° C. and 150° C.
   wherein the silazane is

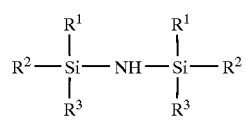

wherein:
   $R^1$, $R^2$, and $R^3$ independently at each occurrence represent H, $C_{1-8}$ alkyl, $C_{1-8}$ haloalkyl $C_{2-8}$ alkenyl, $C_{3-8}$ cycloalkyl, $C_{3-8}$ cycloalkenyl, $C_{6-13}$ aryl, or $C_{6-13}$ haloaryl, or $R^2$ independently represents $C_{2-6}$ haloalkenyl.

2. A process of claim 1 wherein the synthesis of the linear phosphonitrilic chloride catalyst (LPNC) comprises: (i) combining phosphorus pentachloride with a suitable silazane, in a molar ratio of from about 1:1 to about 4:1, in a siloxane medium at a temperature of from about −10° C. to about 75° C. for up to about 5 hours to form the reaction mixture; and (ii) warming the reaction mixture to a temperature of from about 90° C. to about 150° C. for about 1 to 5 hours to yield a LPNC catalyst.

3. A process of claim 2 wherein the siloxane medium is represented by

Formula II

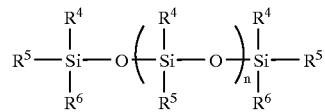

wherein:
   $R^4$, $R^5$, and $R^6$ independently at each occurrence represent H, $C_{1-8}$ alkyl, $C_{1-8}$ haloalkyl, $C_{2-8}$ alkenyl, $C_{3-8}$ cycloalkyl, $C_{3-8}$ cycloalkenyl, $C_{6-13}$ aryl, or $C_{6-13}$ haloaryl, or $R^4$ and $R^6$ independently at each occurrence represent $C_{2-6}$ haloalkenyl; and
   n represents an integer from 0 to 1000.

4. A process of claim 3 wherein:
   $R^1$ independently at each occurrence represents $C_{1-6}$ alkyl, $C_{1-6}$ haloalkyl, $C_{4-6}$ branched alkyl, $C_{4-6}$ branched haloalkyl, $C_{4-8}$ cycloalkyl or cycloalkyl alkyl, or H;
   $R^2$ independently at each occurrence represents $C_{2-6}$ alkenyl, or $C_{2-6}$ haloalkenyl; and
   $R^3$ independently at each occurrence represents $C_{6-13}$ aryl, $C_{7-13}$ aralkyl, or $C_{7-13}$ halo aralkyl.

5. A process of claim 4 wherein:
   $R^4$ and $R^6$ independently at each occurrence represent $C_{1-6}$ alkyl, $C_{1-6}$ haloalkyl, $C_{4-6}$ branched alkyl, $C_{4-6}$ branched haloalkyl, $C_{4-8}$ cycloalkyl, $C_{4-8}$ cycloalkyl alkyl, $C_{2-6}$ alkenyl, $C_{2-6}$ haloalkenyl, $C_{6-13}$ aryl, $C_{7-13}$ aralkyl, or $C_{7-13}$ halo aralkyl; and
   $R^5$ represents $C_{1-4}$ alkyl.

6. A process of claim 5 wherein the molar ratio of the phosphorus pentachloride to the silazane is from about 2:1 to about 3:1.

7. A process of claim 6 wherein the phosphorus pentachloride and the silazane are combined at a temperature of from about 0° C. to about 40° C.

8. A process of claim 7 wherein the temperature is from about 5° C. to about 15° C.

9. A process of claim 8 wherein the silazane is tetramethyldivinyl silazane or hexamethyidisilazane.

10. A process of claim 9, wherein the siloxane medium is 20 cP hexamethylsiloxane terminated polydimethylsiloxane (PDMS).

11. A process of claim 10 wherein $R^1$ and $R^6$ represent trifluoropropyl and $R^3$ represents chlorophenyl.

* * * * *